(12) United States Patent
Wang et al.

(10) Patent No.: US 11,650,838 B2
(45) Date of Patent: May 16, 2023

(54) METHOD, ELECTRONIC DEVICE AND COMPUTER PROGRAM PRODUCT FOR REDUCING VIRTUAL MACHINE RUNNING TIME IN A DATA PROTECTION ENVIRONMENT

(71) Applicant: EMC IP Holding Company LLC, Hopkinton, MA (US)

(72) Inventors: Cheng Wang, Beijing (CN); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 232 days.

(21) Appl. No.: 16/865,918

(22) Filed: May 4, 2020

(65) Prior Publication Data

US 2021/0271505 A1  Sep. 2, 2021

(30) Foreign Application Priority Data

Feb. 27, 2020  (CN) .......................... 202010125603.X

(51) Int. Cl.
  *G06F 9/455*  (2018.01)
  *G06F 9/445*  (2018.01)
  *G06F 9/4401*  (2018.01)

(52) U.S. Cl.
  CPC ........ *G06F 9/45558* (2013.01); *G06F 9/4418* (2013.01); *G06F 9/44505* (2013.01); *G06F 2009/45575* (2013.01); *G06F 2009/45591* (2013.01)

(58) Field of Classification Search
  None
  See application file for complete search history.

(56) References Cited

U.S. PATENT DOCUMENTS

| 2014/0189685 | A1* | 7/2014 | Kripalani | ............. G06F 3/0605 718/1 |
| 2018/0013651 | A1* | 1/2018 | Lang | ................... H04L 67/1027 |
| 2019/0332411 | A1* | 10/2019 | Leitao | .................. G06F 9/4418 |
| 2021/0075768 | A1* | 3/2021 | Polimera | ............ H04L 63/0281 |

* cited by examiner

*Primary Examiner* — Lewis A Bullock, Jr.
*Assistant Examiner* — Melissa A Headly
(74) *Attorney, Agent, or Firm* — Womble Bond Dickinson (US) LLP

(57) ABSTRACT

Embodiments of the present disclosure relate to a method, an electronic device, and a computer program product for controlling a virtual machine. The method comprises: determining external information related to the running of the virtual machine, the external information indicating a first period to be occupied by the virtual machine to process data in association with another virtual machine; determining internal information related to the running of the virtual machine, the internal information indicating a second period to be occupied by the virtual machine to process internally stored data; determining a stop period of the virtual machine based on the external information and the internal information; and controlling the virtual machine to stop running during the stop period. Using the technical solution of the present disclosure, it is possible to intelligently reduce the unnecessary running time of a virtual data protection and storage apparatus in a cloud environment, and thus minimize the running cost of the virtual data protection and storage apparatus itself, which not only can reduce the user cost but also can improve the user experience.

17 Claims, 4 Drawing Sheets

METHOD, ELECTRONIC DEVICE AND COMPUTER PROGRAM PRODUCT FOR REDUCING VIRTUAL MACHINE RUNNING TIME IN A DATA PROTECTION ENVIRONMENT

CROSS-REFERENCE TO RELATED APPLICATION

This patent application claims priority, under 35 U.S.C. § 119, of Chinese Patent Application No. 202010125603.X, filed Feb. 27, 2020, which is incorporated by reference in its entirety.

TECHNICAL FIELD

Embodiments of the present disclosure generally relate to the field of data protection, and in particular, to a method, an electronic device, and a computer program product for controlling a virtual machine.

BACKGROUND

Data protection products mainly protect a user's stored data through backup, so that when user data is unavailable due to hardware or software problems, the user's stored data can be restored through previously generated backup data. Virtual data protection products are data protection products that run in a virtual environment which includes local and cloud environments. Generally speaking, a cloud computing product uses a pay as you go mode to charge users based on their use of the cloud computing product. Therefore, when a virtual data protection product runs in a cloud environment, its cost overhead includes the overhead for the following items: virtual machine which is also referred to as virtual machine instance, block storage, object storage, and operations to access object storage, including backup operation, recovery operation, replication operation, garbage collection operation, disk cleaning operation, etc. Therefore, cost saving for any of the above items can help the user reduce the operation overhead of the virtual data protection product in the cloud environment.

In a virtual data protection product running in a cloud environment, a virtual entity used to store backup data and perform operations such as replication, garbage collection, and disk cleaning on the backup data may be referred to as a data protection and storage apparatus, which may be a virtual machine. In a conventional virtual data protection product, the data protection and storage apparatus keeps normal running except when it is in a maintenance period called a maintenance window. However, data backup can only perform periodic incremental backups after an initial full backup, and incremental backup does not take much time. In addition, the data protection and storage apparatus does not take long to perform the data replication, garbage collection, and disk cleaning operations. Therefore, the data protection and storage apparatus may still keep running when no operation is carried out, resulting in a waste of cost for the user, which further reduces the user experience.

SUMMARY OF THE INVENTION

Embodiments of the present disclosure provide a method, an electronic device, and a computer program product for controlling a virtual machine.

In a first aspect of the present disclosure, a method for controlling a virtual machine is provided. The method comprises: determining external information related to the running of the virtual machine, the external information indicating a first period to be occupied by the virtual machine to process data in association with another virtual machine; determining internal information related to the running of the virtual machine, the internal information indicating a second period to be occupied by the virtual machine to process internally stored data; determining a stop period of the virtual machine based on the external information and the internal information; and controlling the virtual machine to stop running during the stop period.

In a second aspect of the present disclosure, an electronic device is provided. The device comprises: at least one processing unit; and at least one memory coupled to the at least one processing unit and storing instructions for execution by the at least one processing unit, wherein the instructions, when executed by the at least one processing unit, cause the device to perform actions, the actions comprising: determining external information related to the running of a virtual machine, the external information indicating a first period to be occupied by the virtual machine to process data in association with another virtual machine; determining internal information related to the running of the virtual machine, the internal information indicating a second period to be occupied by the virtual machine to process internally stored data; determining a stop period of the virtual machine based on the external information and the internal information; and controlling the virtual machine to stop running during the stop period.

In a third aspect of the present disclosure, a computer program product is provided. The computer program product is tangibly stored on a non-transitory computer-readable medium and contains machine-executable instructions which, when executed, cause a machine to perform any of steps of the method according to the first aspect of the present disclosure.

This summary is provided to introduce the selection of concepts in a simplified form, which will be further described in the detailed description below. This summary is neither intended to identify key features or essential features of the embodiments of the present disclosure, nor intended to limit the scope of the embodiments of the present disclosure.

DESCRIPTION OF THE DRAWINGS

The foregoing and other objectives, features, and advantages of the present disclosure will become more apparent from more detailed description of the example embodiments of the present disclosure in conjunction with the accompanying drawings. In the example embodiments of the present disclosure, identical reference numerals usually represent identical components.

In the various figures, identical or corresponding reference numerals represent identical or corresponding parts.

DETAILED DESCRIPTION

Figure 1:
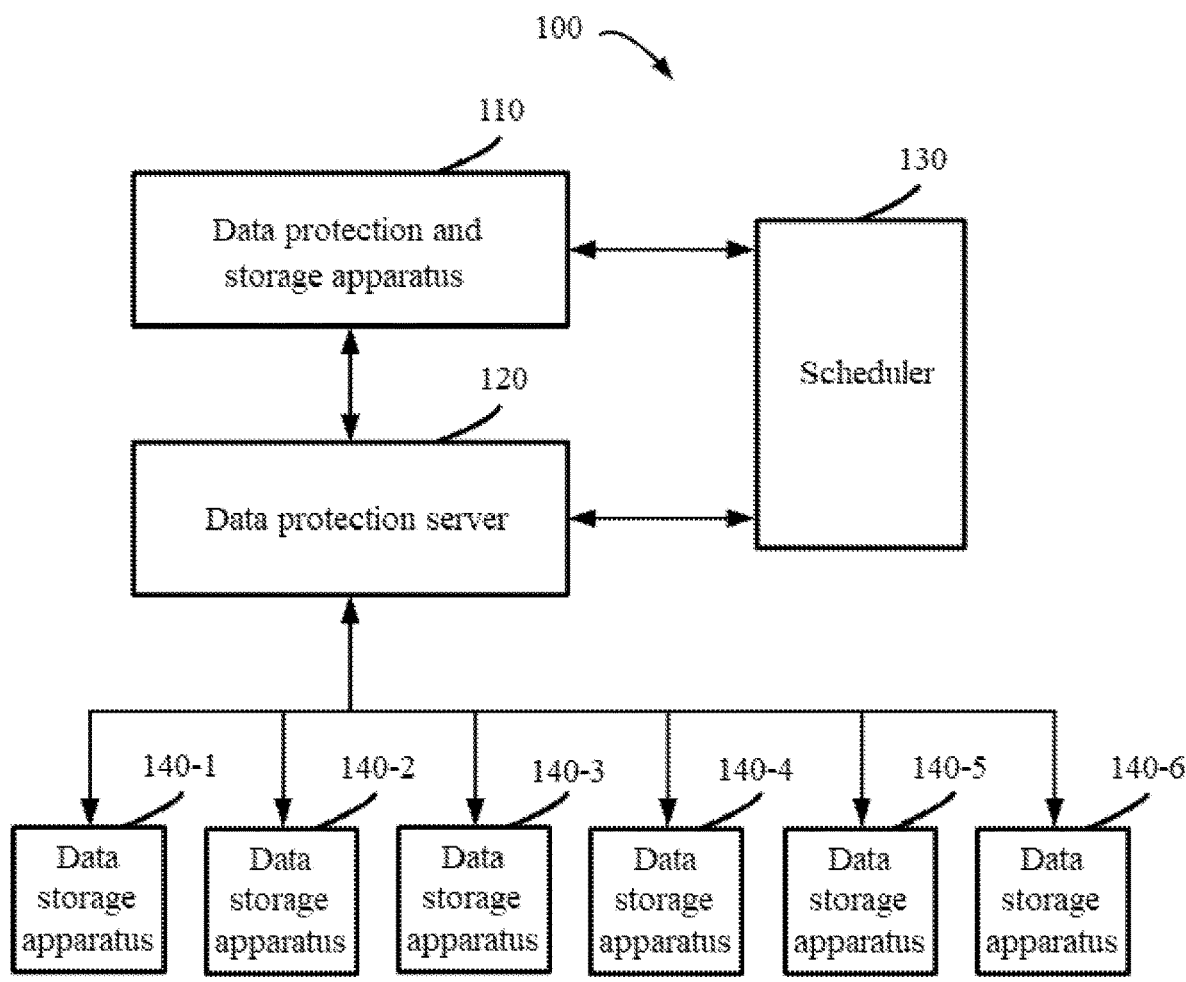
FIG. 1 shows a schematic diagram of data protection environment 100 in which a method for controlling a virtual machine in some embodiments of the present disclosure may be implemented.

Preferred embodiments of the present disclosure will be described in more detail hereinafter with reference to the accompanying drawings. Although the preferred embodiments of the present disclosure are shown in the accompanying drawings, it should be understood that the present disclosure can be implemented in a variety of forms and should not be limited by the embodiments set forth herein. But rather, these embodiments are provided so that the present disclosure will be more thorough and complete, and the scope of the present disclosure can be fully conveyed to those skilled in the art.

As used herein, the term "comprise/include" and variations thereof mean open inclusion, e.g., "comprising/including but not limited to." Unless specifically stated, the term "or" means "and/or." The term "based on" means "based at least in part on." The terms "one example embodiment" and "one embodiment" mean "at least one embodiment." The term "another embodiment" means "at least one additional embodiment." The terms "first," "second," etc., may refer to different or identical objects. Other explicit and implicit definitions may also be included below.

As described above in the background, with a conventional virtual data protection product, the data protection and storage apparatus may still keep running when no operation is performed, resulting in a waste of cost for the user, which further reduces the user experience.

The inventor carried out analysis by taking a virtual data protection and storage apparatus with a storage space of, e.g., 96 TB as an example. Specifically speaking, when the usage degree of the user data space of the virtual data protection and storage apparatus is different, such as 0 TB, 16 TB, 48 TB, 64 TB, and 96 TB respectively, the proportion that the running cost of the virtual data protection and storage apparatus itself accounts for in the overall cost of the virtual data protection product is determined.

When the user data space usage of the virtual data protection and storage apparatus is 0 TB, since the system disk cost, metadata disk cost, object storage cost, data writing cost, garbage collection cost, data recovery cost and replication cost are all very low or even non-existent in this case, a proportion that the running cost of the virtual data protection and storage apparatus itself accounts for in the overall cost of the virtual data protection product is above 80%.

When the user data space usage of the virtual data protection and storage apparatus is 16 TB, the metadata disk cost and object storage cost in this case will increase significantly. However, although the system disk cost, data writing cost, garbage collection cost, data recovery cost and replication cost exist, they are still very low, and therefore, a proportion of the running cost of the virtual data protection and storage apparatus itself to the overall cost of the virtual data protection product will reach 50% to 80%.

Thereafter, when the user data space usage of the virtual data protection and storage apparatus reaches 48 TB, 64 TB, and 96 TB, respectively, since the proportions of the metadata disk cost and object storage cost and the duration of garbage collection will increase gradually, a proportion that the running cost of the virtual data protection and storage apparatus itself accounts for in the overall cost of the virtual data protection product will decrease gradually. When the user data space usage of the virtual data protection and storage apparatus finally reaches 96 TB, a proportion that the running cost of the virtual data protection and storage apparatus itself accounts for in the overall cost of the virtual data protection product will reach 10% to 15%.

From the perspective of cost reduction and considering that a user may rent a large number of virtual data protection and storage apparatuses, the inventor realized that, in the case of the above proportions, even if the use cost of the virtual data protection and storage apparatuses can be reduced by 10%, it is still possible to achieve considerable cost reduction, which not only can reduce the user cost but also can improve the user experience.

Embodiments of the present disclosure propose a new method for controlling a virtual machine. This method knows in advance a backup window of a virtual data protection and storage apparatus and periods occupied by internal system activities, so that the running of the virtual data protection and storage apparatus can be stopped at a time other than the above periods. According to this new method for controlling a virtual machine, it is possible to intelligently reduce the unnecessary running time of a virtual data protection and storage apparatus in a cloud environment, thus minimizing the running cost of the virtual data protection and storage apparatus itself.

FIG. 1 shows a schematic diagram of data protection environment 100 in which a method for controlling a virtual machine in some embodiments of the present disclosure may be implemented. According to an embodiment of the present disclosure, data protection environment 100 may be a cloud environment. As shown in FIG. 1, data protection environment 100 comprises data protection and storage apparatus 110, data protection server 120, scheduler 130, and a plurality of data storage apparatuses 140-1, 140-2, 140-3, 140-4, 140-5, and 140-6 that may be collectively referred to as data storage apparatus 140.

It should be understood that data protection environment 100 is merely illustrative but not restrictive, and it is extensible, in which more data protection and storage apparatuses, data protection servers, schedulers, and data storage apparatuses may be included, so that the demand from more users for simultaneously performing data protection can be satisfied.

In data protection environment 100, data protection and storage apparatus 110 and data protection server 120 may be, for example, virtual machines. Scheduler 130 may be, for example, a virtual machine, an application running in a virtual machine, a function as a service (FAAS), or even a process running in data protection server 120. Data storage apparatus 140 may be, for example, a virtual machine, a database, a file system, or any other entity that needs data protection. It should be noted that the term "virtual machine" used in the present application may include either a virtual machine in the conventional sense or a container.

In data protection environment 100, data stored in data storage apparatus 140 can be backed up by a user using data protection server 120, or by data protection server 120 spontaneously to data protection and storage apparatus 110, or data can be read from data protection and storage apparatus 110. According to an embodiment of the present disclosure, data protection server 120 may back up the data stored in data storage apparatus 140 to data protection and storage apparatus 110 according to information preset by the user or in a default manner. A period for backing up data can be referred to as a backup window. There may be a plurality of backup windows of the same or different lengths within a time range in days, weeks, months, or even years. The backup window includes information about the start time of backup and the duration of the backup. In addition, the user can use data protection server 120 at any time to back up the data stored in data storage apparatus 140 to data protection and storage apparatus 110 and perform a data reading or data writing operation on data protection and storage apparatus 110.

Data protection and storage apparatus 110 may back up the data from data storage apparatus 140 in a manner of deduplication backup, thereby backing up a large amount of data with a relatively small space. Data protection and storage apparatus 110 may also perform a replication operation on the data backed up or stored therein to achieve better data protection, and may perform operations such as garbage collection and disk cleaning on the data backed up or stored therein to achieve more efficient use of the storage space of data protection and storage apparatus 110.

In data protection environment 100, scheduler 130 may acquire information about the backup window from data protection server 120, and may acquire from data protection and storage apparatus 110 information about when to perform a replication operation, a garbage collection operation, a disk cleaning operation, or a data verification operation. According to an embodiment of the present disclosure, the information about when to perform a replication operation, a garbage collection operation, a disk cleaning operation, or a data verification operation originates from the inside of data protection and storage apparatus 110, and thus may also be referred to as internal information. The information about the backup window originates from data protection server 120, which is external relative to data protection and storage apparatus 110, and therefore, the information may also be referred to as external information. According to an embodiment of the present disclosure, the external information may further include requests from a user for using data protection server 120 to back up the data stored in data storage apparatus 140 to data protection and storage apparatus 110, to write data into data protection and storage apparatus 110, or to read data from data protection and storage apparatus 110.

After acquiring the internal information and the external information from data protection and storage apparatus 110 and data protection server 120, respectively, scheduler 130 can issue an instruction to data protection and storage apparatus 110 to control data protection and storage apparatus 110 to stop running during a period when operations such as backup and replication, garbage collection and disk cleaning are not required, so as to save the running cost of data protection and storage apparatus 110. This period may be referred to as a stop period.

According to an embodiment of the present disclosure, data protection and storage apparatus 110 may comprise a daemon process for monitoring operations such as backup, replication, recovery, garbage collection, and disk cleaning, which can predict when operations such as garbage collection, disk cleaning, or data verification will be performed based on runtime statistics such as capacity use of data protection and storage apparatus 110, and can interact with scheduler 130 on behalf of data protection and storage apparatus 110 to transmit internal information to scheduler 130 or to acquire an instruction for stopping the running of data protection and storage apparatus 110 from the scheduler.

In addition, in data protection environment 100 shown in FIG. 1, the interaction between data protection and storage apparatus 110, data protection server 120, scheduler 130, and data storage apparatus 140 can be performed over a network.

Figure 2:
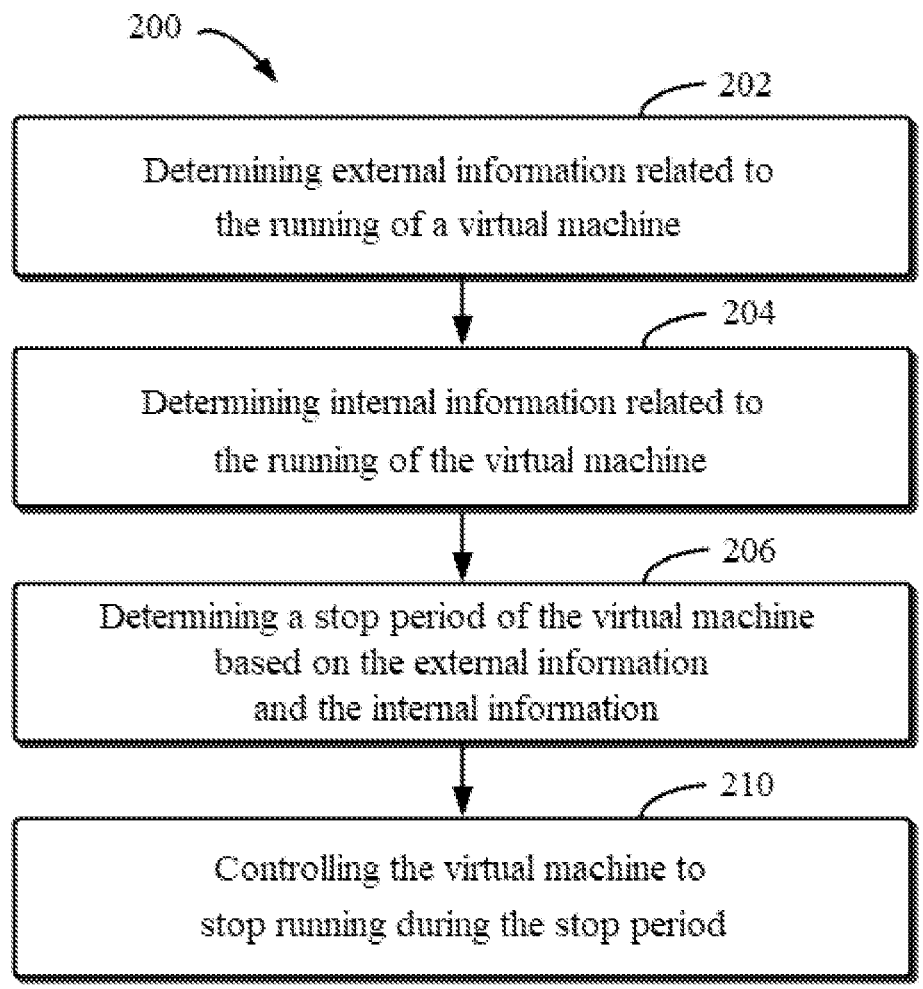
FIG. 2 shows a flowchart of method 200 for controlling a virtual machine according to an embodiment of the present disclosure.

FIG. 2 shows a flowchart of method 200 for controlling a virtual machine according to an embodiment of the present disclosure. Method 200 may be implemented by scheduler 130 in data protection environment 100, or be implemented by other appropriate devices. It should be understood that method 200 for controlling a virtual machine may further comprise additional steps not shown and/or may omit the steps shown, and the scope of the embodiments of the present disclosure is not limited in this regard.

At block 202, scheduler 130 determines external information related to the running of data protection and storage apparatus 110. According to an embodiment of the present disclosure, the external information may include information about a backup window, which indicates, for example, a first period to be occupied by data protection and storage apparatus 110 to process data in association with data protection server 120, wherein the associated processing of data may comprise a user using data protection server 120 for or data protection server 120 spontaneously backing up the data stored in data storage apparatus 140 to data protection and storage apparatus 110, or reading data from data protection and storage apparatus 110.

According to some embodiments, scheduler 130 may acquire the external information directly from data protection server 120. According to some other embodiments, after data protection server 120 sends the external information to data protection and storage apparatus 110, scheduler 130 may acquire the external information from data protection and storage apparatus 110. According to an embodiment of the present disclosure, scheduler 130 can, for example, in a polling manner, poll data protection server 120 or data protection or storage apparatus 110 to acquire the external information. Alternatively, data protection server 120 or data protection and storage apparatus 110 can, for example, in a manner of notification, directly send the external information to scheduler 130.

It should be noted that the first period is not necessarily a single period but may be multiple periods, because there may be multiple backup windows in one day, one week, one month, or one year.

At block 204, scheduler 130 determines internal information related to the running of data protection and storage apparatus 110. According to an embodiment of the present disclosure, the internal information may indicate, for example, a second period to be occupied by data protection and storage apparatus 110 to process internally stored data, wherein the processing of the internally stored data may comprise performing, by data protection and storage apparatus 110, a replication operation, a garbage collection operation, a disk cleaning operation or a data verification operation on the data backed up or stored. According to an embodiment of the present disclosure, scheduler 130 may directly acquire the internal information from data protection and storage apparatus 110. Likewise, scheduler 130 can, for example, in a polling manner, poll data protection and storage apparatus 110 to acquire the internal information, or data protection and storage apparatus 110 can, for example, in a manner of notification, directly send the internal information to scheduler 130.

It should also be noted that the second period is not necessarily a single period but may be multiple periods.

At block 206, scheduler 130 determines a stop period of data protection and storage apparatus 110 based on the first period and the second period. According to an embodiment of the present disclosure, the first period and the second period respectively indicate a period to be occupied by data protection and storage apparatus 110 to interact with data protection server 120 for data backup, data writing or data reading and a period to be occupied by data protection and storage apparatus 110 to perform operations on the data stored therein. Therefore, within periods other than the above two periods, data protection and storage apparatus 110 does not need to perform any operation, so these periods may be referred to as stop periods. During a stop period, the running of data protection and storage apparatus 110 can be stopped without affecting operations such as data backup, data writing, data reading, data replication, garbage collection, disk cleaning, or data verification that data protection and storage apparatus 110 needs to perform.

At block 208, scheduler 130 controls data protection and storage apparatus 110 to stop running during a stop period. According to an embodiment of the present disclosure, scheduler 130 may use an application programming interface provided by a service provider of data protection and storage apparatus 110 to directly issue an instruction to data protection and storage apparatus 110, so as to request data protection and storage apparatus 110 to stop running during a stop period. When the stop period expires, data protection and storage apparatus 110 may resume running automatically or resume running in response to receiving an instruction sent by scheduler 130 via the application programming interface. In some embodiments, when data protection and storage apparatus 110 resumes running automatically, the time required for data protection and storage apparatus 110 to resume from a stop state to a normal state should be taken into consideration, and the operation to resume running should be carried out in advance so as to immediately resume to the normal running state when the stop period expires. This required time can be determined by data protection and storage apparatus 110 based on the statistical data required for previous stop and recovery, or can be estimated and obtained by data protection and storage apparatus 110 based on its own configuration information.

According to an embodiment of the present disclosure, controlling data protection and storage apparatus 110 to stop running may comprise, for example, suspending data protection and storage apparatus 110, putting data protection and storage apparatus 110 into sleep, or shutting down data protection and storage apparatus 110. The scope of the embodiments of the present disclosure is not limited in this regard.

Figure 3:
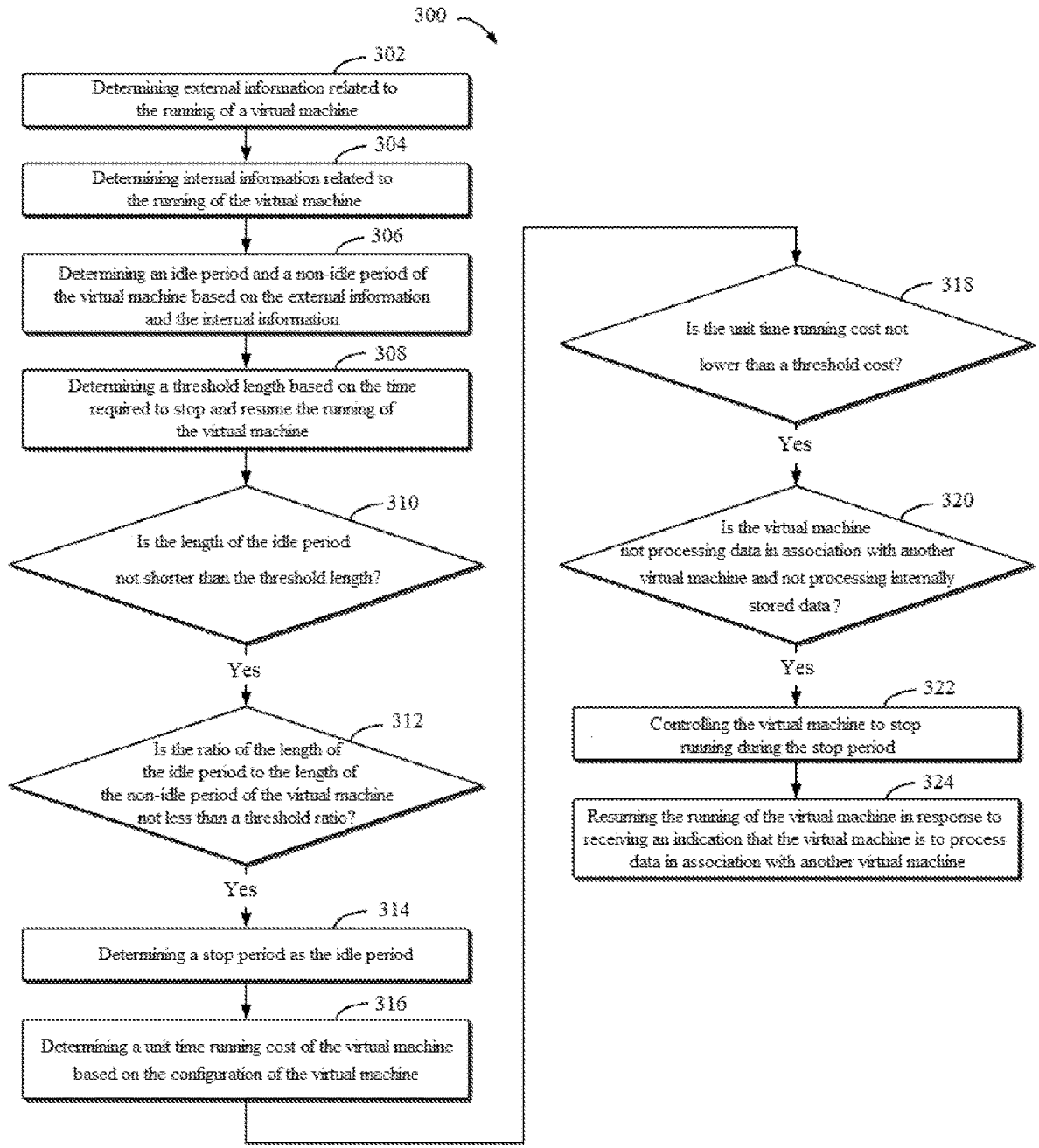
FIG. 3 shows a flowchart of method 300 for controlling a virtual machine according to an embodiment of the present disclosure.

FIG. 3 shows a flowchart of method 200 for controlling a virtual machine according to an embodiment of the present disclosure. Likewise, method 300 may also be implemented by scheduler 130 in data protection environment 100, and may also be implemented by other appropriate devices. It should be understood that method 300 may further comprise additional steps not shown and/or may omit the steps shown, and the scope of the present disclosure is not limited in this regard. Method 300 for controlling a virtual machine is a specific implementation of method 200 for controlling a virtual machine.

At block 302, scheduler 130 determines external information related to the running of data protection and storage apparatus 110. Specific content of this step is the same as the step described in block 202, which will not be repeated here.

At block 304, scheduler 130 determines internal information related to the running of data protection and storage apparatus 110. Specific content this step is the same as the step described in block 204, which will not be repeated here.

At block 306, scheduler 130 determines an idle period and a non-idle period of data protection and storage apparatus 110 based on the first period and the second period. According to an embodiment of the present disclosure, the first period and the second period respectively indicate a period to be occupied by data protection and storage apparatus 110 to interact with data protection server 120 for data backup, data writing or data reading and a period to be occupied by data protection and storage apparatus 110 to perform operations on the data stored therein. These periods can be referred to as the non-idle period of data protection and storage apparatus 110. Therefore, except for the above non-idle period, data protection and storage apparatus 110 does not need to perform any operation, and thus can be regarded as being in an idle state. The period during which data protection and storage apparatus 110 is in an idle state may be referred to as an idle period. In method 300 for controlling a virtual machine, it is not necessary to stop the running of data protection and storage apparatus 110 during the idle period, but a series of conditions need to be further determined.

At block 308, scheduler 130 determines a threshold length based on the time required to stop and resume the running of data protection and storage apparatus 110. According to an embodiment of the present disclosure, the threshold length will be used to determine whether the running of data protection and storage apparatus 110 needs to be stopped, wherein the threshold length may be, for example, equal to the time required to stop and resume the running of data protection and storage apparatus 110 plus a certain length of time. The purpose of setting the threshold length is to avoid that in a process during which data protection and storage apparatus 110 is stopped, a time except the time required to stop and resume the running of data protection and storage apparatus 110 is too short, that is, to avoid that a time during which the running of data protection and storage apparatus 110 is actually stopped for reducing the user cost is too short. For example, if the time required to stop and resume the running of data protection and storage apparatus 110 is 5 minutes, it may be considered to set the threshold length to 15 minutes. In this case, if the length of an actually determined idle period is longer than 15 minutes, it can be guaranteed that the period during which the running of data protection and storage apparatus 110 is actually stopped for reducing the user cost can be longer than 15-5=10 minutes.

According to an embodiment of the present disclosure, the threshold length may be set according to a time during which the running of data protection and storage apparatus 110 is actually stopped that a user wishes to achieve, or a preset threshold length may be used.

At block 310, scheduler 130 determines whether the length of the idle period determined at block 306 is not shorter than the threshold length determined at block 308. When scheduler 130 determines that the length of the idle period is shorter than the threshold length, scheduler 130 does not perform any operation. When scheduler 130 determines that the length of an idle period is longer than or equal to the threshold length, method 300 proceeds to block 312 for further operations.

At block 312, scheduler 130 determines whether the ratio of the length of the idle period determined at block 306 to the length of the non-idle period of data protection and storage apparatus 110 is not less than a threshold ratio. When scheduler 130 determines that the ratio of the length of the idle period to the length of the non-idle period is not less than the threshold ratio, scheduler 130 does not perform any operation. When scheduler 130 determines that the ratio of the length of the idle period to the length of the non-idle period is greater than or equal to the threshold ratio, method 300 proceeds to block 314 for further operations.

According to an embodiment of the present disclosure, the sum of the idle period and the non-idle period of data protection and storage apparatus 110 is the total running time of data protection and storage apparatus 110. The purpose of setting the threshold ratio is to prevent the effect brought by stopping the running of data protection and storage apparatus 110 from being too small because the proportion of the non-idle period in the total running time is too small. For example, if the time required to stop and resume the running of data protection and storage apparatus 110 is 5 minutes and the length of the actually determined idle period is equal to 15 minutes, it can be determined that the period during which the running of data protection and storage apparatus 110 is actually stopped can reach 15-5=10 minutes. However, if the non-idle period of data protection and storage apparatus 110 is found to be 1,485 minutes at this time, it can be determined that the proportion of the non-idle period in the total running time is 15/(15+1485) =1%. At this time, even if the running of data protection and storage apparatus 110 is stopped during the idle period, the cost reduction related to the running of data protection and storage apparatus 110 that can be achieved is only less than 1%.

According to an embodiment of the present disclosure, the threshold proportion may be set according to a proportion of the non-idle period in the total running time that the user wishes to achieve, or a preset threshold proportion may be used.

At block 314, scheduler 130 determines the idle period determined at block 306 as a stop period. According to an embodiment of the present disclosure, when it is determined at block 310 and block 312, respectively, that the length of the idle period determined at block 306 is not shorter than the threshold length and the ratio of the length of the idle period to the length of the non-idle period is not less than the threshold ratio, it is indicated that, in this case, the problem of a too short time during which the running of data protection and storage apparatus 110 is actually stopped for reducing the user cost can be avoided, and the problem that the effect brought by stopping the running of data protection and storage apparatus 110 is too small because the proportion of the non-idle period in the total running time is too small can be avoided. Therefore, the idle period can be used as the stop period.

At block 316, scheduler 130 determines a unit time running cost of data protection and storage apparatus 110 based on the configuration of data protection and storage apparatus 110. According to an embodiment of the present disclosure, the service provider of data protection and storage apparatus 110 will use a pay-as-you-go mode to charge users, wherein the usage fee of data protection and storage apparatus 110 is related to the configuration including computing power, storage capacity, and the like. Therefore, scheduler 130 may determine a fee to be charged to the user based on the configuration of data protection and storage apparatus 110. Since data protection and storage apparatus 110 has a usage period of a fixed length, the unit time running cost of data protection and storage apparatus 110, e.g., the running cost per minute or per hour, can be further calculated.

According to an embodiment of the present disclosure, scheduler 130 may also directly calculate the unit time running cost according to a pre-recorded fee to be charged to the user for the use of data protection and storage apparatus 110 as well as the usage period of data protection and storage apparatus 110, without relying on the configuration of data protection and storage apparatus 110.

At block 318, scheduler 130 determines whether the unit time running cost determined at block 316 is not lower than a threshold cost. When scheduler 130 determines that the unit time running cost is lower than the threshold ratio, scheduler 130 does not perform any operation. When scheduler 130 determines that the unit time running cost is higher than or equal to the threshold ratio, method 300 proceeds to block 320 for further operations.

According to an embodiment of the present disclosure, scheduler 130 may choose not to stop the running of data protection and storage apparatus 110 when the unit time running cost of data protection and storage apparatus 110 is relatively low. Therefore, the purpose of setting the threshold cost is to prevent the effect brought by stopping the running of data protection and storage apparatus 110 from being too small.

According to an embodiment of the present disclosure, the threshold cost may be set according to the minimum reachable unit time running to stop the running of data protection and storage apparatus 110 that the user wishes to achieve, or a preset threshold cost may be used.

At block 320, scheduler 130 determines whether data protection and storage apparatus 110 is not processing data in association with data protection server 120 and is not processing internally stored data. When scheduler 130 determines that data protection and storage apparatus 110 is processing data in association with data protection server 120 or is processing internally stored data, scheduler 130 does not perform any operation. When scheduler 130 determines that data protection and storage apparatus 110 is not processing data in association with data protection server 120 and is not processing internally stored data, method 300 proceeds to block 322 for further operations.

According to an embodiment of the present disclosure, although scheduler 130 determines the external information related to the running of data protection and storage apparatus 110 at block 302, for example, a backup window, the user may still use data protection server 120 at any time to back up data, write data to data protection and storage apparatus 110, or read data from data protection and storage apparatus 110. In this case, in order to ensure the normal use of data protection and storage apparatus 110 by the user, the running of data protection and storage apparatus 110 cannot be stopped. Likewise, although scheduler 130 determines the internal information related to the running of data protection storage apparatus 110 at block 304, for example, the period to be occupied by data protection and storage apparatus 110 to perform a replication operation, a garbage collection operation, a disk cleaning operation, or a data verification operation on the data backed up or stored, the internal information will contain predictions, for example, predications made by data protection and storage apparatus 110 about when operations such as garbage collection, disk cleaning, and data verification will be performed, and the estimated time these operations will take. In this case, it is possible that data protection and storage apparatus 110 has not completed the ongoing operations such as garbage collection, disk cleaning, or data verification when the period indicated by the internal information expires. At this moment, in order to ensure that normal operations of data protection and storage apparatus 110 are not stopped, the running of data protection and storage apparatus 110 cannot be stopped.

At block 324, scheduler 130 controls data protection and storage apparatus 110 to stop running during a stop period. Specific content of this step is the same as the step described in block 208, which will not be repeated here.

It should be noted that, according to an embodiment of the present disclosure, scheduler 130 may choose to suspend data protection and storage apparatus 110, put data protection and storage apparatus 110 into sleep, or shut down data protection and storage apparatus 110 depending on how much longer the length of the idle period is compared to the threshold length. If the length of the idle period is very long compared to the threshold length, it may choose to shut down data protection and storage apparatus 110; otherwise, it may choose to suspend data protection and storage apparatus 110 or put data protection and storage apparatus 110 into sleep.

At block 326, scheduler 130 resumes the running of data protection and storage apparatus 110 during the stop period in response to receiving an indication that data protection and storage apparatus 110 is to process data in association with data protection server 120. According to an embodiment of the present disclosure, as described above, the user may use data protection server 120 at any time to back up data, write data to data protection and storage apparatus 110, or read data from data protection and storage apparatus 110. Therefore, even during the stop period, as long as scheduler 130 receives a corresponding request, it can immediately resume the running of data protection and storage apparatus 110 to ensure the execution of the user's request. In this process, the user's request may be received by scheduler 130 in the form of external information.

Related content of data backup environment 100 in which the method for controlling a virtual machine in some embodiments of the present disclosure can be implemented, method 200 for controlling a virtual machine according to an embodiment of the present disclosure and method 300 for controlling a virtual machine according to an embodiment of the present disclosure is described above with reference to FIGS. 1 to 3. It should be understood that the above description is intended to better illustrate the content described in the embodiments of the present disclosure, and is not intended to limit in any way.

It should be understood that the number of various elements and the magnitude of physical quantities used in the embodiments of the present disclosure and the various accompanying drawings are merely examples, and are not intended to limit the scope of protection of the embodiments of the present disclosure. The above number and magnitude can be arbitrarily set as required without affecting the normal implementation of the embodiments of the present disclosure.

Further, the method for controlling a virtual machine described in the embodiments of the present disclosure can also be applied to other virtual machines in data protection products, including data protection server 120. Because data protection server 120 can be a virtual machine that is only used by a user during working hours, the running of data protection server 120 can be stopped when the user does not use data protection server 120. It should be noted that when the method for controlling a virtual machine described in the embodiments of the present disclosure is applied to data protection server 120, since data protection server 120 does not receive external information from the outside which instructs data protection server 120 to perform operations such as data backup, data writing and data reading, the external information determined in the method for controlling a virtual machine can be considered as null. Likewise, in the above method, determining the stop period of data protection server 120 based on the external information and the internal information may also be regarded as determining the stop period of data protection server 120 only based on the internal information because the external information is null.

Through the above description with reference to FIGS. 1 to 3, the technical solution according to the embodiments of the present disclosure has many advantages over the conventional solution. For example, using this technical solution, scheduler 130 can determine the idle period of data protection and storage apparatus 110 based on the internal information and the external information acquired from data protection and storage apparatus 110 and data protection server 120, respectively, and can determine, through a criterion such as the length of the idle period, whether stopping the running of data protection and storage apparatus 110 can bring effective cost savings without affecting the normal running of data protection and storage apparatus 110, so that the running of data protection and storage apparatus 110 can be intelligently stopped during the idle period to save the user cost and bring better user experience for the user. In addition, according to the technical solution of the embodiments of the present disclosure, after the running of data protection and storage apparatus 110 is stopped, it is also possible to resume the normal running of data protection and storage apparatus 110 in time in response to the expiration of the idle period or a request for performing operations on data protection and storage apparatus 110, so as not to bring inconvenience to normal use of data protection and storage apparatus 110 by the user.

Figure 4:
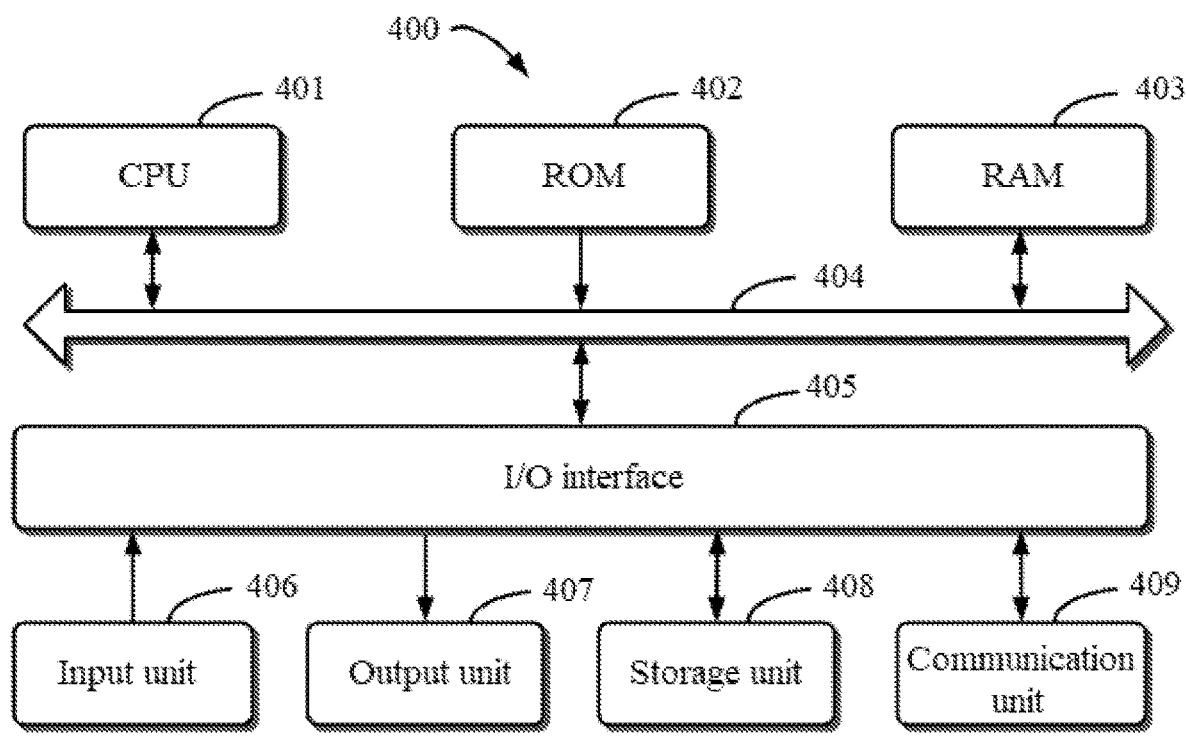
FIG. 4 shows a schematic block diagram of example device 400 that can be used to implement an embodiment of the present disclosure.

FIG. 4 shows a schematic block diagram of example device 400 that can be used to implement an embodiment of the present disclosure. According to an embodiment of the present disclosure, backup device 130 shown in FIG. 1 may be implemented as example device 400. As shown in the figure, device 400 comprises central processing unit (CPU) 401 that can perform various appropriate actions and processing according to computer program instructions stored in read-only memory (ROM) 402 or computer program instructions loaded into random access memory (RAM) 403 from storage unit 408. In RAM 403, various programs and data required for the operation of device 400 can also be stored. CPU 401, ROM 402, and RAM 403 are connected to each other via bus 404. Input/output (I/O) interface 405 is also connected to bus 404.

A plurality of components in device 400 are connected to I/O interface 405, including: input unit 406, e.g., a keyboard, a mouse, etc.; output unit 407, e.g., various types of displays, speakers, etc.; storage unit 408, e.g., a magnetic disk, an optical disk, etc.; and communication unit 409, e.g., a network card, a modem, a wireless communication transceiver, etc. Communication unit 409 allows device 400 to exchange information/data with other devices over a computer network such as the Internet and/or various telecommunication networks.

Various processes and processing of method 200 and method 300, for example, described above may be performed by processing unit 401. For example, in some embodiments, method 200 and method 300 may be implemented as a computer software program that is tangibly contained in a machine-readable medium such as storage unit 408. In some embodiments, some or all of the computer program may be loaded and/or installed onto device 400 via ROM 402 and/or communication unit 409. When the computer program is loaded to RAM 403 and executed by CPU 401, one or more actions of method 200 and method 300 described above may be performed.

Embodiments of the present disclosure may relate to a method, a device, a system, and/or a computer program product. The computer program product may include a computer-readable storage medium, on which computer-readable program instructions for performing various aspects of the embodiments of the present disclosure are loaded.

The computer-readable storage medium may be a tangible device that can hold and store instructions used by an instruction-executing device. The computer-readable storage medium may be, for example, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or a protruding structure within a groove on which instructions are stored, and any suitable combination of the above. The computer-readable storage medium used herein is not to be interpreted as transient signals per se, such as radio waves or other freely propagating electromagnetic waves, electromagnetic waves propagated through waveguides or other transmission media, e.g., light pulses propagated through fiber optic cables, or electrical signals transmitted through electrical wires.

The computer-readable program instructions described herein can be downloaded from the computer-readable storage medium to various computing/processing devices, or downloaded to an external computer or an external storage device over a network, e.g., the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from a network and forwards the computer-readable program instructions for storage in the computer-readable storage medium in each computing/processing device.

The computer program instructions for performing operations of the embodiments of the present disclosure may be assembly instructions, instruction set architecture (ISA) instructions, machine instructions, machine-related instructions, microcode, firmware instructions, status setting data, or source code or object code written in any combination of one or more programming languages. The programming languages include object-oriented programming languages (such as Smalltalk, C++, etc.) and conventional procedural programming languages (such as the "C" language or similar programming languages). The computer-readable program instructions can be completely executed on a user's computer, partially executed on a user's computer, executed as a separate software package, partially executed on a user's computer and partially executed on a remote computer, or completely executed on a remote computer or a server. In cases involving a remote computer, the remote computer can be connected to a user's computer over any kind of networks, including a local area network (LAN) or a wide area network (WAN), or it can be connected to an external computer, for example, over the Internet by using an Internet service provider. In some embodiments, an electronic circuit, for example, a programmable logic circuit, a field programmable gate array (FPGA), or a programmable logic array (PLA), is customized by utilizing state information of the computer-readable program instructions. The electronic circuit may execute the computer-readable program instructions to implement various aspects of the embodiments of the present disclosure.

Various aspects of the embodiments of the present disclosure are described herein with reference to flowcharts and/or block diagrams of the method, device/system and computer program product according to the embodiments of the present disclosure. It should be understood that each block of the flowcharts and/or block diagrams and combinations of the blocks in the flowcharts and/or block diagrams can be implemented by the computer-readable program instructions.

These computer-readable program instructions can be provided to a processing unit of a general-purpose computer, a special purpose computer, or another programmable data processing device, thereby producing a machine such that when these instructions are executed by the processing unit of the computer or another programmable data processing device, an apparatus for implementing the functions/actions specified in one or more blocks in the flowcharts and/or block diagrams is generated. These computer-readable program instructions may also be stored in the computer-readable storage medium, and these instructions cause the computer, the programmable data processing apparatus, and/or another device to work in a specific manner. Therefore, the computer-readable medium storing the instructions includes an article of manufacture that includes instructions for implementing various aspects of the functions/actions specified in one or more blocks in the flowcharts and/or block diagrams.

The computer-readable program instructions can also be loaded onto a computer, another programmable data processing device, or another device, so that a series of operating steps are performed on the computer, another programmable data processing device, or another device to produce a computer-implemented process, so that the instructions executed on the computer, another programmable data processing apparatus, or another device implement the functions/actions specified in one or more blocks in the flowcharts and/or block diagrams.

The flowcharts and block diagrams in the accompanying drawings illustrate the architecture, functions, and operations of possible implementations of systems, methods, and computer program products according to multiple embodiments of the present disclosure. In this regard, each block in the flowcharts or block diagrams may represent a module, a program segment, or a part of instructions, which contains one or more executable instructions for implementing specified logical functions. In some alternative implementations, the functions marked in the blocks may also occur in an order different from that marked in the accompanying drawings. For example, two consecutive blocks may actually be executed substantially in parallel, or sometimes they may be executed in a reverse order, depending on the functions involved. It should also be noted that each block in the block diagrams and/or flowcharts and a combination of blocks in the block diagrams and/or flowcharts can be implemented with a dedicated hardware-based system that performs specified functions or actions, or with a combination of dedicated hardware and computer instructions.

Although various embodiments of the present disclosure have been described above, the above description is illustrative but not exhaustive, and is not limited to the various embodiments disclosed. Many modifications and variations will be apparent to a person of ordinary skill in the art without departing from the scope and spirit of the various embodiments described. The terms used herein are chosen to best explain the principles and practical applications of the various embodiments or the technical improvements to technologies in the market, or to enable other persons of ordinary skill in the art to understand the embodiments disclosed herein.

The invention claimed is:

1. A method for controlling a virtual machine, comprising:
monitoring a running virtual machine;
while running the virtual machine, performing steps of:
  determining external information related to the running of the virtual machine, the external information indicating a first period to be assigned to the virtual machine to co-process data in association with another virtual machine;
  determining internal information related to the running of the virtual machine, the internal information indicating a second period to be occupied by the virtual machine to process internally stored data including performing garbage collection and disk cleaning; and
  determining a stop period of the virtual machine based on the external information and the internal information, wherein determining the stop period includes:
    determining the stop period as an idle period of the virtual machine, at least in response to a ratio of a length of the idle period to a length of a non-idle period of the virtual machine not being less than a threshold ratio, and
    determining that the length of the idle period is not shorter than a threshold length, wherein the threshold length is based on the time required to stop and resume the running of the virtual machine; and
  automatically stopping the running of the virtual machine during the stop period, including causing the virtual machine to stop running based on a determination that the virtual machine is not processing data in association with the another virtual machine and is not processing internally stored data, including when the garbage collection and the disk cleaning are not performed.

2. The method according to claim 1, wherein determining the external information comprises:
acquiring the external information from at least one of the virtual machine and the another virtual machine.

3. The method according to claim 1, wherein determining the stop period further comprises:
determining an idle period of the virtual machine based on the external information and the internal information.

4. The method according to claim 1, wherein the idle period and the non-idle period are determined based on the external information and the internal information.

5. The method according to claim 1, wherein controlling the virtual machine comprises:
determining a unit time running cost of the virtual machine based on the configuration of the virtual machine; and causing the virtual machine to stop running based on a determination that the unit time running cost is not lower than a threshold cost.

6. The method according to claim 1, wherein the external information includes a backup time period obtained from an external data protection server.

7. The method according to claim 1, further comprising:
resuming the running of the virtual machine in response to receiving an indication that the virtual machine is to process the data in association with the another virtual machine during the stop period.

8. An electronic device, comprising:
at least one processing unit; and
at least one memory coupled to the at least one processing unit and storing instructions for execution by the at least one processing unit, wherein the instructions, when executed by the at least one processing unit, cause the device to perform actions, the actions comprising:
monitoring a running virtual machine;
while running the virtual machine, performing steps of:
  determining external information related to the running of a virtual machine, the external information indicating a first period to be occupied by the virtual machine to co-process data in association with another virtual machine;
  determining internal information related to the running of the virtual machine, the internal information indicating a second period to be occupied by the virtual machine to process internally stored data including performing garbage collection and disk cleaning; and
  determining a stop period of the virtual machine based on the external information and the internal information, wherein determining the stop period includes:
    determining the stop period as an idle period of the virtual machine, at least in response to a ratio of a length of the idle period to a length of a non-idle period of the virtual machine not being less than a threshold ratio; and;
    determining that the length of the idle period is not shorter than a threshold length, wherein the threshold length is based on the time required to stop and resume the running of the virtual machine; and
  automatically stopping the running of the virtual machine during the stop period, including causing the virtual machine to stop running based on a determination that the virtual machine is not processing data in association with the another virtual machine and is not processing internally stored data, including when the garbage collection and the disk cleaning are not performed.

9. The device according to claim 8, wherein determining the external information comprises:
acquiring the external information from at least one of the virtual machine and the another virtual machine.

10. The device according to claim 8, wherein determining the stop period further comprises:
determining an idle period and a non-idle period of the virtual machine based on the external information and the internal information.

11. The device according to claim 8, wherein the idle period and the non-idle period are determined based on the external information and the internal information.

12. The device according to claim 8, wherein controlling the virtual machine comprises:
determining a unit time running cost of the virtual machine based on the configuration of the virtual machine; and
causing the virtual machine to stop running based on a determination that the unit time running cost is not lower than a threshold cost.

13. The device according to claim 8, wherein the external information includes a backup time period obtained from an external data protection server.

14. The device according to claim 8, wherein the actions further comprise:
resuming the running of the virtual machine in response to receiving an indication that the virtual machine is to process the data in association with the another virtual machine during the stop period.

15. A computer program product that is tangibly stored on a non-transitory computer-readable medium and contains machine-executable instructions which, when executed, cause a machine to perform operations, the operations comprising:
monitoring a running virtual machine;
while running the virtual machine, performing steps of:
determining external information related to the running of the virtual machine, the external information indicating a first period to be occupied by the virtual machine to co-process data in association with another virtual machine;
determining internal information related to the running of the virtual machine, the internal information indicating a second period to be occupied by the virtual machine to process internally stored data including performing garbage collection and disk cleaning; and
determining a stop period of the virtual machine based on the external information and the internal information, wherein determining the stop period includes:
determining the stop period as an idle period of the virtual machine, at least in response to a ratio of a length of the idle period to a length of a non-idle period of the virtual machine not being less than a threshold ratio; and
determining that the length of the idle period is not shorter than a threshold length, wherein the threshold length is based on the time required to stop and resume the running of the virtual machine; and
automatically stopping the running of the virtual machine during the stop period, including causing the virtual machine to stop running based on a determination that the virtual machine is not processing data in association with the another virtual machine and is not processing internally stored data, including when the garbage collection and the disk cleaning are not performed.

16. The computer program product according to claim 15, wherein determining the external information comprises:
acquiring the external information from at least one of the virtual machine and the another virtual machine.

17. The computer program product according to claim 15, wherein determining the stop period further comprises:
determining an idle period of the virtual machine based on the external information and the internal information.

* * * * *